United States Patent
Taherzadeh Boroujeni et al.

(10) Patent No.: US 11,923,974 B2
(45) Date of Patent: Mar. 5, 2024

(54) CHANGING AN ACTIVITY STATE OF A DOWNLINK RECEPTION OPERATION DURING UPLINK DEMODULATION REFERENCE SIGNAL BUNDLING

(71) Applicant: QUALCOMM Incorporated, San Diego, CA (US)

(72) Inventors: Mahmoud Taherzadeh Boroujeni, San Diego, CA (US); Tao Luo, San Diego, CA (US); Gokul Sridharan, Sunnyvale, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 17/652,142

(22) Filed: Feb. 23, 2022

(65) Prior Publication Data

US 2022/0337340 A1    Oct. 20, 2022

Related U.S. Application Data

(60) Provisional application No. 63/201,172, filed on Apr. 15, 2021.

(51) Int. Cl.
| | |
|---|---|
| *H04L 1/00* | (2006.01) |
| *H04L 5/00* | (2006.01) |
| *H04W 72/04* | (2023.01) |
| *H04W 72/0446* | (2023.01) |
| *H04W 72/23* | (2023.01) |

(52) U.S. Cl.
CPC .......... *H04L 1/0025* (2013.01); *H04L 1/0038* (2013.01); *H04L 5/0051* (2013.01); *H04W 72/0446* (2013.01); *H04W 72/23* (2023.01)

(58) Field of Classification Search
CPC ... H04L 1/0025; H04L 1/0038; H04L 5/0051; H04W 72/23; H04W 72/0446
See application file for complete search history.

(56) References Cited

U.S. PATENT DOCUMENTS

| | | | |
|---|---|---|---|
| 2017/0078964 A1* | 3/2017 | Siomina ................ | H04W 76/28 |
| 2021/0067308 A1* | 3/2021 | Ly .......................... | H04L 1/1854 |
| 2021/0352525 A1* | 9/2021 | Hong .................... | H04W 28/06 |

FOREIGN PATENT DOCUMENTS

WO    WO-2021034063 A1    2/2021

OTHER PUBLICATIONS

International Search Report and Written Opinion—PCT/US2022/070843—ISA/EPO—dated Jun. 10, 2022.
Samsung: "UL Control for URLLC", R1-1906956, 3GPP TSG RAN WG1 #97, EURLLC UL Control, 3rd Generation Partnership Project, Mobile Competence Centre, 650, Route Des Lucioles, F-06921, Sophia-Antipolis Cedex, France, vol. RAN WG1, No. Reno, USA, May 13, 2019-May 17, 2019, May 3, 2019, pp. 1-6, XP051708991.

* cited by examiner

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a user equipment (UE) may determine that an uplink demodulation reference signal (DMRS) bundling operation associated with a physical channel has started. The UE may change an activity state of a reception operation associated with periodic downlink communications based at least in part on determining that the uplink DMRS bundling operation has started. Numerous other aspects are described.

27 Claims, 7 Drawing Sheets

CHANGING AN ACTIVITY STATE OF A DOWNLINK RECEPTION OPERATION DURING UPLINK DEMODULATION REFERENCE SIGNAL BUNDLING

CROSS-REFERENCE TO RELATED APPLICATION

This Patent Applications claims priority to U.S. Provisional Patent Application No. 63/201,172, filed on Apr. 15, 2021, entitled "CHANGING AN ACTIVITY STATE OF A DOWNLINK RECEPTION OPERATION DURING UPLINK DEMODULATION REFERENCE SIGNAL BUNDLING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for changing an activity state of a downlink reception operation during uplink demodulation reference signal bundling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining that an uplink demodulation reference signal (DMRS) bundling operation associated with a physical channel has started; and changing an activity state of a reception operation associated with periodic downlink communications based at least in part on determining that the uplink DMRS bundling operation has started.

In some aspects, a method of wireless communication performed by a network node includes receiving, from a UE, an indication that a plurality of time-domain resources are associated with an uplink DMRS bundling operation associated with a physical channel; and transmitting an activity state indication comprising an indication to change an activity state of a reception operation associated with periodic downlink communications based at least in part on a determination that the uplink DMRS bundling operation has started.

In some aspects, a UE for wireless communication includes a memory, and one or more processors, coupled to the memory, configured to: determine that an uplink DMRS bundling operation associated with a physical channel has started; and change an activity state of a reception operation associated with periodic downlink communications based at least in part on determining that the uplink DMRS bundling operation has started.

In some aspects, a network node for wireless communication includes a memory, and one or more processors, coupled to the memory, configured to: receive, from a UE, an indication that a plurality of time-domain resources are associated with an uplink DMRS bundling operation associated with a physical channel; and transmit an activity state indication comprising an indication to change an activity state of a reception operation associated with periodic downlink communications based at least in part on a determination that the uplink DMRS bundling operation has started.

In some aspects, a non-transitory computer-readable medium storing a set of instructions for wireless communication includes one or more instructions that, when executed by one or more processors of a UE, cause the UE to: determine that an uplink DMRS bundling operation associated with a physical channel has started; and change an activity state of a reception operation associated with periodic downlink communications based at least in part on determining that the uplink DMRS bundling operation has started.

In some aspects, a non-transitory computer-readable medium storing a set of instructions for wireless communication includes one or more instructions that, when executed by one or more processors of a network node, cause the network node to: receive, from a UE, an indication that a plurality of time-domain resources are associated with an uplink DMRS bundling operation associated with a physical channel; and transmit an activity state indication comprising an indication to change an activity state of a reception operation associated with periodic downlink communications based at least in part on a determination that the uplink DMRS bundling operation has started.

In some aspects, an apparatus for wireless communication includes means for determining that an uplink DMRS bundling operation associated with a physical channel has started; and means for changing an activity state of a reception operation associated with periodic downlink communications based at least in part on determining that the uplink DMRS bundling operation has started.

In some aspects, an apparatus for wireless communication includes means for receiving, from a UE, an indication that a plurality of time-domain resources are associated with an uplink DMRS bundling operation associated with a physical channel; and means for transmitting an activity state indication comprising an indication to change an activity state of a reception operation associated with periodic downlink communications based at least in part on a determination that the uplink DMRS bundling operation has started.

Aspects generally include a method, apparatus, system, computer program product, non-transitory computer-readable medium, user equipment, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
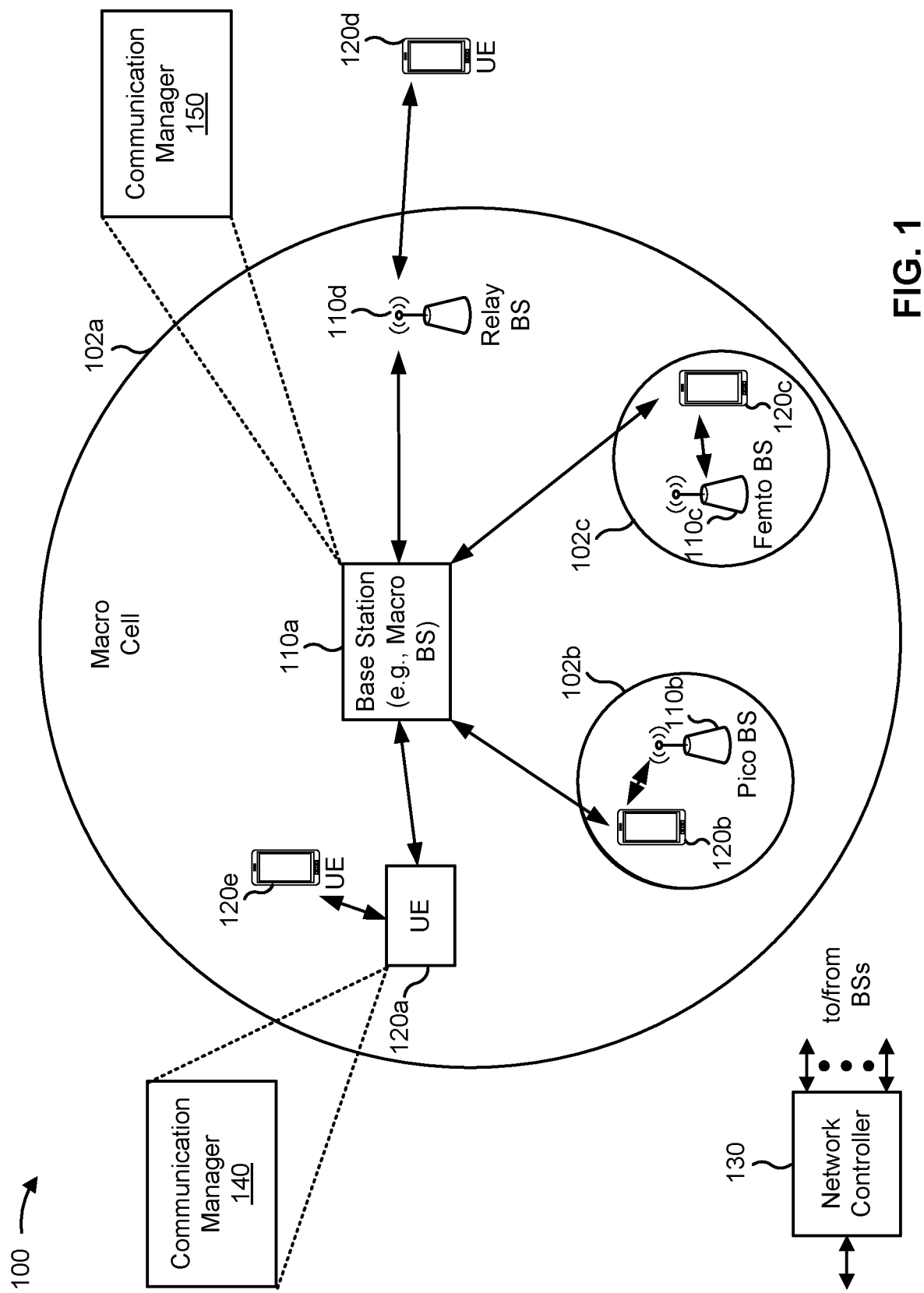
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As described herein, a node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, the UE 120 may include a communication manager 140. As described in more detail elsewhere herein, the communication manager 140 may determine that an uplink demodulation reference signal (DMRS) bundling operation associated with a physical channel has started; and change an activity state of a reception operation associated with periodic downlink communications based at least in part on determining that the uplink DMRS bundling operation has started. Additionally, or alternatively, the communication manager 140 may perform one or more other operations described herein.

In some aspects, a network node (e.g., the base station 110) may include a communication manager 150. As described in more detail elsewhere herein, the communication manager 150 may receive, from a UE, an indication that a plurality of time-domain resources are associated with an uplink DMRS bundling operation associated with a physical channel; and transmit an activity state indication comprising an indication to change an activity state of a reception operation associated with periodic downlink communications based at least in part on a determination that the uplink DMRS bundling operation has started. Additionally, or alternatively, the communication manager 150 may perform one or more other operations described herein.

As indicated above, FIG. 1 is provided as an example. Other examples may differ from what is described with regard to FIG. 1.

Figure 2:
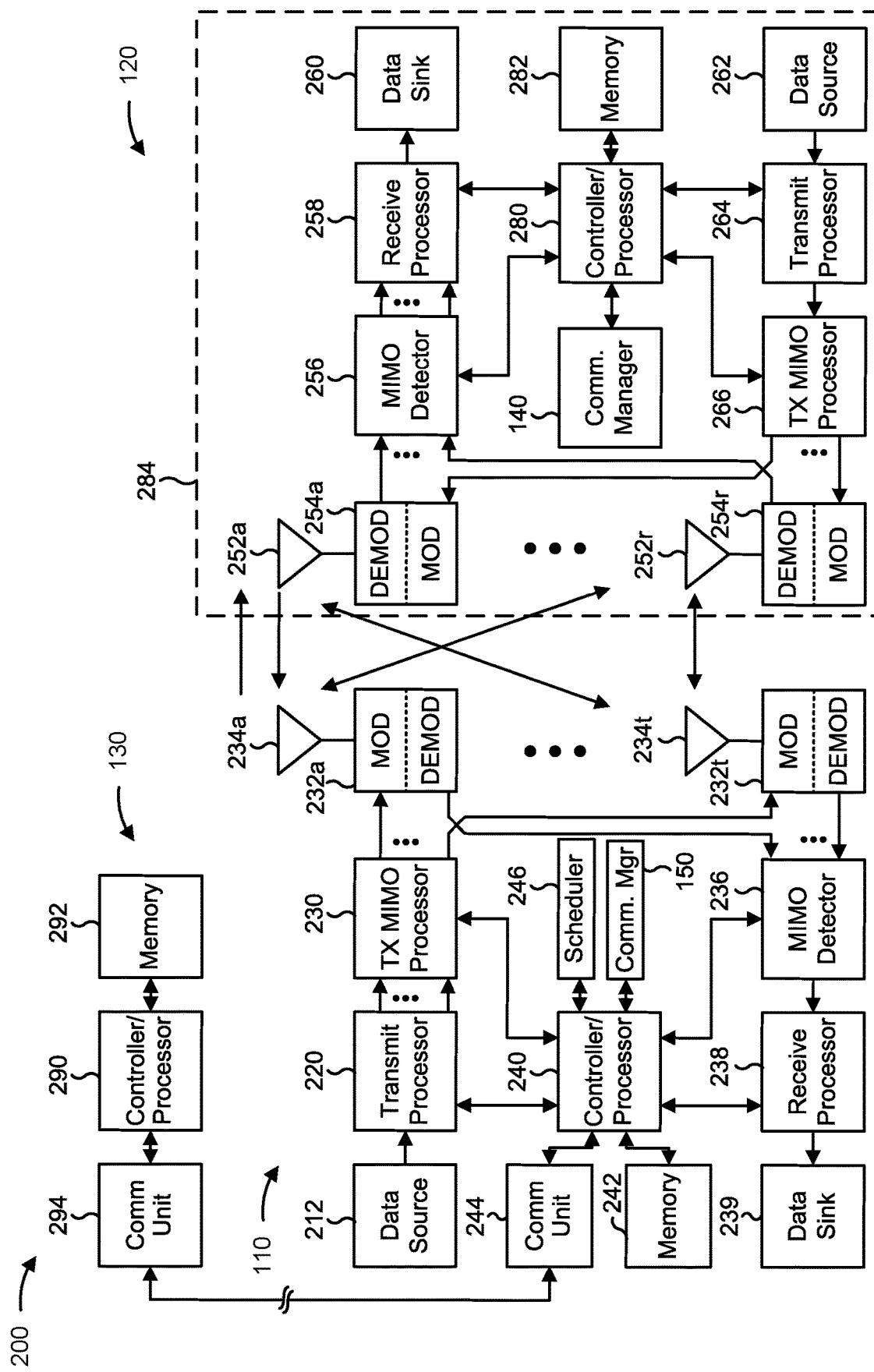
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

In some aspects, the term "base station" (e.g., the base station 110) may refer to an aggregated base station, a disaggregated base station, and/or one or more components of a disaggregated base station. For example, in some aspects, "base station" may refer to a control unit, a distributed unit, a plurality of control units, a plurality of distributed units, and/or a combination thereof. In some aspects, "base station" may refer to one device configured to perform one or more functions such as those described above in connection with the base station 110. In some aspects, "base station" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" may refer to any one or more of those different devices. In some aspects, "base station" may refer to one or more virtual base stations, one or more virtual base station functions, and/or a combination of thereof. For example, in some cases, two or more base station functions may be instantiated on a single device. In some aspects, "base station" may refer to one of the base station functions and not another. In this way, a single device may include more than one base station.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

Controller/processor 240 of base station 110, controller/processor 280 of UE 120, and/or any other component(s) of FIG. 2 may perform one or more techniques associated with changing an activity state of a downlink reception operation during uplink DMRS bundling, as described in more detail elsewhere herein. In some aspects, the network node described herein may be, include, or be included in a base station (e.g., base station 110). For example, controller/ processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, the UE includes means for determining that an uplink DMRS bundling operation associated with a physical channel has started; and/or means for changing an activity state of a reception operation associated with periodic downlink communications based at least in part on determining that the uplink DMRS bundling operation has started. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the network node includes means for receiving, from a UE, an indication that a plurality of time-domain resources are associated with an uplink DMRS bundling operation associated with a physical channel; and/or means for transmitting an activity state indication comprising an indication to change an activity state of a reception operation associated with periodic downlink communications based at least in part on a determination that the uplink DMRS bundling operation has started. The means for the network node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some cases, a transmitter, such as a UE or a network node, may transmit one or more demodulation reference signals (DMRSs) to a receiver such as another UE or a BS. A DMRS may include a reference signal that is generated from a base sequence, such as a Zadoff-Chu sequence or a Gold sequence. A DMRS may carry information used to estimate a radio channel for demodulation of an associated physical channel (e.g., PDCCH, PDSCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs are used for both downlink communications and uplink communications.

The receiver may perform one or more measurements of the DMRS to estimate a physical channel on which one or more communications are transmitted from the transmitter. In this way, for example, the UE may determine whether a channel quality of the physical channel satisfies one or more channel quality thresholds, and may use the results from the one or more measurements to facilitate demodulation of the communications transmitted on the physical channel.

In some cases, a UE may associate or bundle a plurality of time-domain resources for purposes of joint channel estimation (which may be referred to as uplink DMRS bundling and/or DMRS bundling), in which case the network node may assume that the same precoder is used across the plurality of time-domain resources and that DMRS transmissions across the plurality of time-domain resources may be coherently filtered to increase the accuracy of the channel estimation.

In some cases, whether a UE supports physical uplink shared channel (PUSCH) DMRS bundling and/or physical uplink control channel (PUCCH) DMRS bundling can depend on one or more UE capabilities for phase continuity maintenance. In some cases, the ability of a UE to maintain phase continuity can depend on whether the PUSCH transmission (or PUCCH transmission) is contiguous, a length of a gap between transmissions, and/or a configuration of the gap between transmissions, among other examples.

In some cases, a UE may perform a reception operation between uplink DMRS transmissions (e.g., between PUSCH repetitions or PUCCH repetitions), which may have a negative impact on phase continuity. A network node may mitigate this negative impact in the case of scheduled (dynamic) physical downlink shared channel (PDSCH) communications by refraining from scheduling a PDSCH communication during a time period corresponding to an uplink DMRS bundling operation. However, dynamic scheduling may not prevent the UE from performing periodic reception operations during a time period corresponding to an uplink DMRS bundling operation. Thus, a UE that performs periodic reception operations during DMRS bundling operations may not be capable of maintaining phase continuity, thereby having a negative impact on the effectiveness and/or support of uplink DMRS bundling operations. As a result, some UEs may not support joint channel estimation, which may result in decreased demodulation performance, increased transmission overhead, and/or other negative impacts on UE and/or network performance.

Some aspects of the techniques and apparatuses described herein may facilitate changing an activity state of a downlink reception operation during uplink DMRS bundling. For example, in some aspects, a UE may obtain an activity state indication that may include an indication to change an activity state of a reception operation associated with periodic downlink communications based at least in part on a determination that an uplink DMRS bundling operation has started. The activity state indication may be provided by a network node (e.g., via RRC configuration and/or downlink control information (DCI)) and/or indicated in a wireless communication standard. Thus, in some aspects, a UE may determine that an uplink DMRS bundling operation has started and, based at least in part on that determination, may drop and/or deprioritize a reception operation during a time period corresponding to the uplink DMRS operation. In this way, some aspects described herein may facilitate UE support of joint channel estimation, which may result in increased demodulation performance, decreased transmission overhead, and/or other positive impacts on UE and/or network performance.

Figure 3:
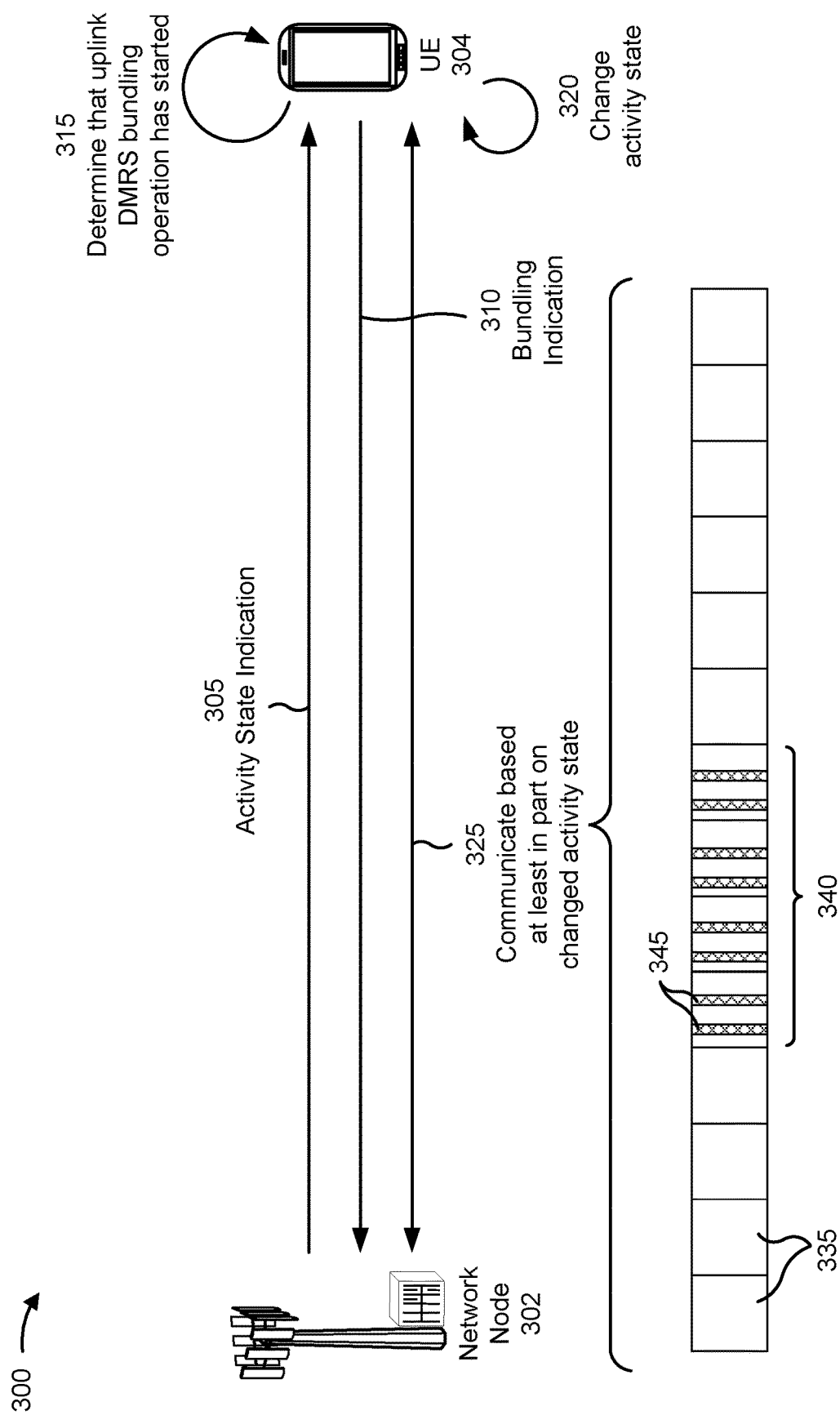
FIG. 3 is a diagram illustrating an example associated with changing an activity state of a downlink reception operation during uplink demodulation reference signal (DMRS) bundling, in accordance with the present disclosure.

FIG. 3 is a diagram illustrating an example 300 associated with changing an activity state of a downlink reception operation during uplink DMRS bundling, in accordance with the present disclosure. As shown in FIG. 3, a network node 302 and a UE 304 may communicate with one another.

As show by reference number 305, the network node 302 may transmit, and the UE 304 may receive, an activity state indication. The activity state indication may include an indication to change an activity state of a reception operation associated with periodic downlink communications based at least in part on a determination that the uplink DMRS bundling operation has started. The reception operation may include at least one of a monitoring action or a receiving action (e.g., monitoring downlink communications and/or receiving downlink communications).

In some aspects, the network node 302 may transmit the activity state indication by transmitting an activity state configuration that includes the activity state indication. For example, the network node 302 may transmit a radio resource control (RRC) message that indicates the activity state configuration. In some aspects, the indication to change the activity state of the reception operation may include an indication to drop or deprioritize blind detection of physical downlink control channel (PDCCH) communications associated with one or more monitoring occasions that occur during a time period corresponding to the uplink DMRS bundling operation. In those aspects, the activity state configuration may include a portion of a search space configuration for a search space associated with the one or more monitoring occasions and/or a portion of a control resource set (CORESET) configuration for a CORESET associated with the one or more monitoring occasions, among other examples.

In some aspects, the activity state configuration may include a portion of a semi-persistent scheduling (SPS) configuration. In some aspects, the activity state configuration may include a portion of a configuration of a configured grant that indicates a PUSCH repetition. In some aspects, the activity state configuration may include a portion of a PUCCH resource set configuration that indicates a bundled PUCCH repetition. As used herein, the term "repetition" is used to refer to an initial communication and is also used to refer to a repeated transmission of the initial communication. For example, if the UE 304 is configured to transmit four repetitions, then the UE 304 may transmit an initial transmission and may transmit three repeated transmissions of that initial transmission. Thus, each transmission (regardless of whether the transmission is an initial transmission or a retransmission) is considered a repetition. A repetition may be transmitted in a transmission occasion, which is sometimes referred to as a transmission instance.

In some aspects, the network node 302 may transmit a DCI transmission that includes the activity state indication. In some aspects, the DCI transmission may activate an SPS configuration. In some aspects, the DCI transmission may schedule a plurality of repetitions of a PUSCH and/or a PUCCH.

In some aspects, the UE 304 may transmit, and the network node 302 may receive, an indication of a UE capability of the UE 304. The network node 302 may transmit the activity state indication based at least in part on the UE capability. In some aspects, for example, the UE capability may include a capability of maintaining a phase continuity for a pair of uplink communications having an intervening event that occurs between a transmission of a first uplink communication of the pair of uplink communications and a transmission of a second uplink communication of the pair of uplink communications.

In some aspects, the indication to change the activity state of the reception operation may include an indication to drop the reception operation during a time period corresponding to the uplink DMRS bundling operation. In some aspects, the indication to drop the reception operation may include an indication to drop blind detection of PDCCH communications associated with one or more monitoring occasions that occur during the time period corresponding to the uplink DMRS bundling operation. In some aspects, the indication to change the activity state of the reception operation may include an indication to deprioritize the reception operation during a time period corresponding to the uplink DMRS bundling operation.

In some aspects, the periodic downlink communications may include at least one SPS instance that occurs during a time period corresponding to the uplink DMRS bundling operation. In some aspects, the uplink DMRS bundling operation may include a joint channel estimation process for at least one of a PUSCH transmission or a PUCCH transmission. In some aspects, the uplink DMRS bundling operation may include a joint channel estimation process for a plurality of repetitions of at least one of a PUSCH or a PUCCH.

As shown by reference number 310, the UE 304 may transmit, and the network node 302 may receive, a bundling indication. The bundling indication may include an indication that a plurality of time-domain resources are associated with an uplink DMRS bundling operation associated with a physical channel.

As shown by reference number 315, the UE 304 may determine that an uplink DMRS bundling operation associated with a physical channel has started. As shown by reference number 320, the UE 304 may change an activity state of a reception operation associated with periodic downlink communications based at least in part on determining that the uplink DMRS bundling operation has started. As shown by reference number 325, the network node 302 and the UE 304 may communicate based at least in part on the changed activity state.

For example, as shown by reference number 330, a number of communication resources 335 may be available. The UE 304 may perform an uplink DMRS bundling operation that includes transmitting DMRSs 345 to the network node 302. In some aspects, the UE 304 may change an activity state of a reception operation (e.g., a monitoring operation and/or a receiving operation) during a time period 340 corresponding to the uplink DMRS bundling operation.

In some aspects, the UE 304 may change the activity state of the reception operation by dropping the reception operation during a time period corresponding to the uplink DMRS bundling operation. In some aspects, dropping the reception operation may include dropping blind detection of PUCCH communications associated with one or more monitoring occasions that occur during the time period corresponding to the uplink DMRS bundling operation. In some aspects, changing the activity state of the reception operation may include changing the activity state of the reception operation based at least in part on the activity state indication.

In some aspects, changing the activity state of the reception operation may include deprioritizing the reception operation during a time period corresponding to the uplink DMRS bundling operation. As used herein, "deprioritizing" refers to changing a priority level from a first priority level to a second priority level that is lower than the first priority level. In some aspects, changing the activity state of the reception operation may include dropping or deprioritizing blind detection of PDCCH communications associated with one or more monitoring occasions that occur during a time period corresponding to the uplink DMRS bundling operation. In some aspects, changing the activity state of the reception operation may include dropping or deprioritizing blind detection of PDCCH communications associated with one or more monitoring occasions that occur during a time period corresponding to the uplink DMRS bundling operation.

As indicated above, FIG. 3 is provided as an example. Other examples may differ from what is described with respect to FIG. 3.

Figure 4:
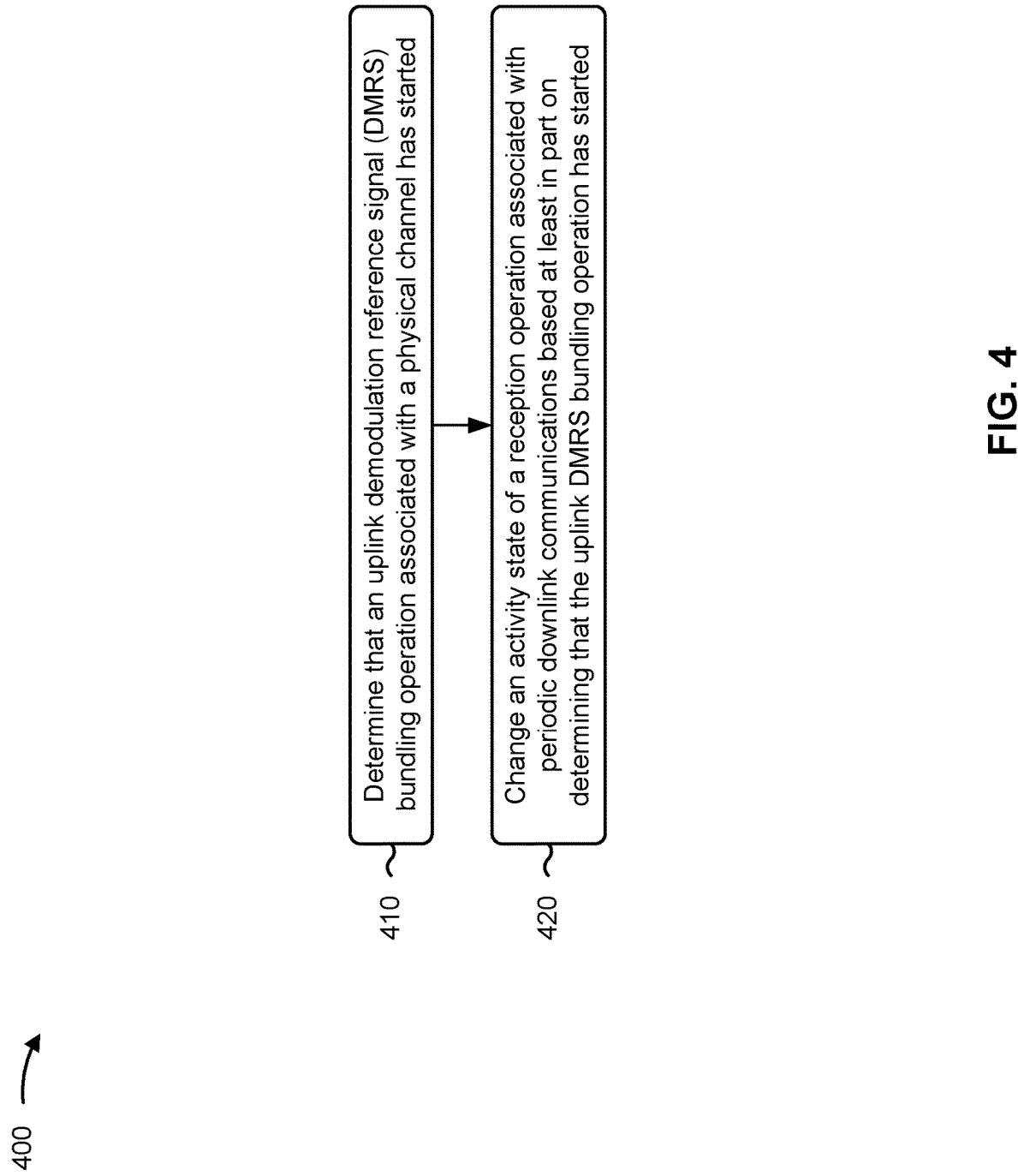
FIGS. 4 and 5 are diagrams illustrating example processes associated with changing an activity state of a downlink reception operation during uplink DMRS bundling, in accordance with the present disclosure.

FIG. 4 is a diagram illustrating an example process 400 performed, for example, by a UE, in accordance with the present disclosure. Example process 400 is an example where the UE (e.g., UE 304) performs operations associated with changing an activity state of a downlink reception operation during uplink DMRS bundling.

As shown in FIG. 4, in some aspects, process 400 may include determining that an uplink DMRS bundling operation associated with a physical channel has started (block 410). For example, the UE (e.g., using determination component 610, depicted in FIG. 6) may determine that an uplink DMRS bundling operation associated with a physical channel has started, as described above.

As further shown in FIG. 4, in some aspects, process 400 may include changing an activity state of a reception operation associated with periodic downlink communications based at least in part on determining that the uplink DMRS bundling operation has started (block 420). For example, the UE (e.g., using communication manager 608, depicted in FIG. 6) may change an activity state of a reception operation associated with periodic downlink communications based at least in part on determining that the uplink DMRS bundling operation has started, as described above.

Process 400 may include additional aspects, such as any single aspect or any combination of aspects described below and/or in connection with one or more other processes described elsewhere herein.

In a first aspect, changing the activity state of the reception operation comprises dropping the reception operation during a time period corresponding to the uplink DMRS bundling operation.

In a second aspect, alone or in combination with the first aspect, dropping the reception operation comprises dropping blind detection of PDCCH communications associated with one or more monitoring occasions that occur during the time period corresponding to the uplink DMRS bundling operation.

In a third aspect, alone or in combination with one or more of the first and second aspects, changing the activity state of the reception operation comprises deprioritizing the reception operation during a time period corresponding to the uplink DMRS bundling operation.

In a fourth aspect, alone or in combination with one or more of the first through third aspects, the reception operation comprises at least one of a monitoring action or a receiving action.

In a fifth aspect, alone or in combination with one or more of the first through fourth aspects, the periodic downlink communications comprise at least one semi-persistent scheduling instance that occurs during a time period corresponding to the uplink DMRS bundling operation.

In a sixth aspect, alone or in combination with one or more of the first through fifth aspects, the uplink DMRS bundling operation comprises a joint channel estimation process for a plurality of repetitions of at least one of a PUSCH or a PUCCH.

In a seventh aspect, alone or in combination with one or more of the first through sixth aspects, the uplink DMRS bundling operation comprises a joint channel estimation process for at least one of a PUSCH transmission or a PUCCH transmission.

In an eighth aspect, alone or in combination with one or more of the first through seventh aspects, process 400 includes receiving, from a network node, an activity state configuration comprising an activity state indication, wherein changing the activity state of the reception operation comprises changing the activity state of the reception operation based at least in part on the activity state indication.

In a ninth aspect, alone or in combination with the eighth aspect, receiving the activity state configuration comprises receiving an RRC message that indicates the activity state configuration.

In a tenth aspect, alone or in combination with one or more of the eighth through ninth aspects, changing the activity state of the reception operation comprises dropping or deprioritizing blind detection of PDCCH communications associated with one or more monitoring occasions that occur during a time period corresponding to the uplink DMRS bundling operation, and the activity state configuration comprises a portion of a search space configuration for a search space associated with the one or more monitoring occasions.

In an eleventh aspect, alone or in combination with one or more of the eighth through tenth aspects, changing the activity state of the reception operation comprises dropping or deprioritizing blind detection of PDCCH communications associated with one or more monitoring occasions that occur during a time period corresponding to the uplink DMRS bundling operation, and the activity state configuration comprises a portion of a CORESET configuration for a CORESET associated with the one or more monitoring occasions.

In a twelfth aspect, alone or in combination with one or more of the eighth through eleventh aspects, the activity state configuration comprises a portion of an SPS configuration.

In a thirteenth aspect, alone or in combination with one or more of the eighth through twelfth aspects, the activity state configuration comprises a portion of a configuration of a configured grant that indicates a PUSCH repetition.

In a fourteenth aspect, alone or in combination with one or more of the eighth through thirteenth aspects, the activity state configuration comprises a portion of a PUCCH resource set configuration that indicates a bundled PUCCH repetition.

In a fifteenth aspect, alone or in combination with one or more of the first through fourteenth aspects, process 400 includes receiving, from a network node, a DCI transmission comprising an activity state indication, wherein changing the activity state of the reception operation comprises changing the activity state of the reception operation based at least in part on the activity state indication.

In a sixteenth aspect, alone or in combination with the fifteenth aspect, the DCI transmission activates an SPS configuration.

In a seventeenth aspect, alone or in combination with one or more of the fifteenth through sixteenth aspects, the DCI transmission schedules a plurality of repetitions of a PUSCH.

In an eighteenth aspect, alone or in combination with one or more of the fifteenth through seventeenth aspects, the DCI transmission indicates one or more repetitions of a PUCCH.

In a nineteenth aspect, alone or in combination with one or more of the first through eighteenth aspects, process 400 includes determining a UE capability of the UE, wherein changing the activity state of the reception operation comprises changing the activity state of the reception operation based at least in part on the UE capability.

In a twentieth aspect, alone or in combination with the nineteenth aspect, the UE capability comprises a capability of maintaining a phase continuity for a pair of uplink communications having an intervening event that occurs between a transmission of a first uplink communication of the pair of uplink communications and a transmission of a second uplink communication of the pair of uplink communications.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
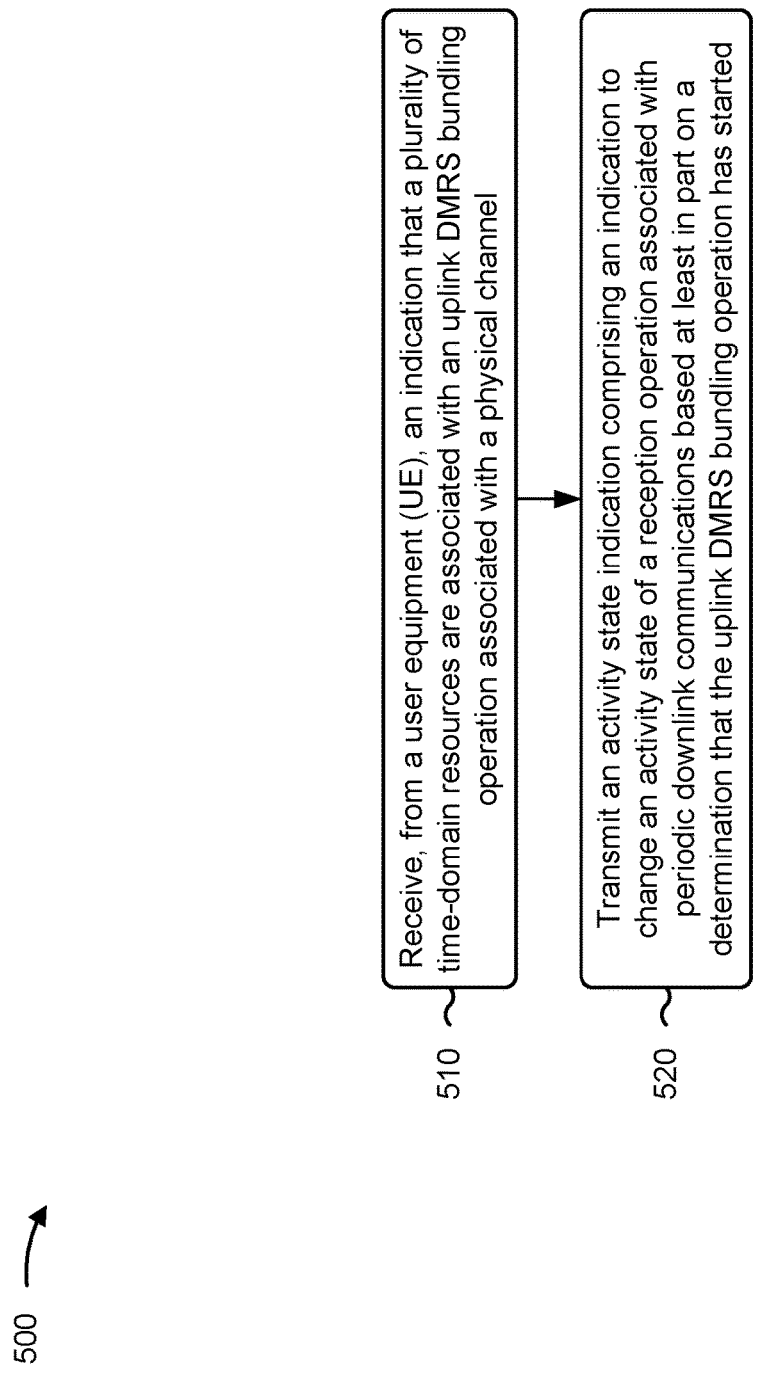

FIG. 5 is a diagram illustrating an example process 500 performed, for example, by a network node, in accordance with the present disclosure. Example process 500 is an example where the network node (e.g., network node 302) performs operations associated with changing an activity state of a downlink reception operation during uplink DMRS signal bundling.

As shown in FIG. 5, in some aspects, process 500 may include receiving, from a UE, an indication that a plurality of time-domain resources are associated with an uplink DMRS bundling operation associated with a physical channel (block 510). For example, the network node (e.g., using reception component 702, depicted in FIG. 7) may receive, from a UE, an indication that a plurality of time-domain resources are associated with an uplink DMRS bundling operation associated with a physical channel, as described above.

As further shown in FIG. 5, in some aspects, process 500 may include transmitting an activity state indication comprising an indication to change an activity state of a reception operation associated with periodic downlink communications based at least in part on a determination that the uplink DMRS bundling operation has started (block 520). For example, the network node (e.g., using transmission component 704, depicted in FIG. 7) may transmit an activity state indication comprising an indication to change an activity state of a reception operation associated with periodic downlink communications based at least in part on a determination that the uplink DMRS bundling operation has started, as described above.

Process 500 may include additional aspects, such as any single aspect or any combination of aspects described below and/or in connection with one or more other processes described elsewhere herein.

In a first aspect, the indication to change the activity state of the reception operation comprises an indication to drop the reception operation during a time period corresponding to the uplink DMRS bundling operation.

In a second aspect, alone or in combination with the first aspect, the indication to drop the reception operation comprises an indication to drop blind detection of PDCCH communications associated with one or more monitoring occasions that occur during the time period corresponding to the uplink DMRS bundling operation.

In a third aspect, alone or in combination with one or more of the first and second aspects, the indication to change the activity state of the reception operation comprises an indication to deprioritize the reception operation during a time period corresponding to the uplink DMRS bundling operation.

In a fourth aspect, alone or in combination with one or more of the first through third aspects, the reception operation comprises at least one of a monitoring action or a receiving action.

In a fifth aspect, alone or in combination with one or more of the first through fourth aspects, the periodic downlink communications comprise at least one SPS instance that occurs during a time period corresponding to the uplink DMRS bundling operation.

In a sixth aspect, alone or in combination with one or more of the first through fifth aspects, the uplink DMRS bundling operation comprises a joint channel estimation process for a plurality of repetitions of at least one of a PUSCH or a PUCCH.

In a seventh aspect, alone or in combination with one or more of the first through sixth aspects, the uplink DMRS bundling operation comprises a joint channel estimation process for at least one of a PUSCH transmission or a PUCCH transmission.

In an eighth aspect, alone or in combination with one or more of the first through seventh aspects, transmitting the activity state indication comprising transmitting an activity state configuration that includes the activity state indication.

In a ninth aspect, alone or in combination with the eighth aspect, transmitting the activity state configuration comprises transmitting an RRC message that indicates the activity state configuration.

In a tenth aspect, alone or in combination with one or more of the eighth through ninth aspects, the indication to change the activity state of the reception operation comprises an indication to drop or deprioritize blind detection of PDCCH communications associated with one or more monitoring occasions that occur during a time period corresponding to the uplink DMRS bundling operation, and the activity state configuration comprises a portion of a search space configuration for a search space associated with the one or more monitoring occasions.

In an eleventh aspect, alone or in combination with one or more of the eighth through tenth aspects, the indication to change the activity state of the reception operation comprises an indication to drop or deprioritize blind detection of PDCCH communications associated with one or more monitoring occasions that occur during a time period corresponding to the uplink DMRS bundling operation, and the activity state configuration comprises a portion of a CORESET configuration for a CORESET associated with the one or more monitoring occasions.

In a twelfth aspect, alone or in combination with one or more of the eighth through eleventh aspects, the activity state configuration comprises a portion of an SPS configuration.

In a thirteenth aspect, alone or in combination with one or more of the eighth through twelfth aspects, the activity state configuration comprises a portion of a configuration of a configured grant that indicates a PUSCH repetition.

In a fourteenth aspect, alone or in combination with one or more of the eighth through thirteenth aspects, the activity state configuration comprises a portion of a PUCCH resource set configuration that indicates a bundled PUCCH repetition.

In a fifteenth aspect, alone or in combination with one or more of the first through fourteenth aspects, transmitting the activity state indication comprises transmitting a DCI transmission comprising the activity state indication.

In a sixteenth aspect, alone or in combination with the fifteenth aspect, the DCI transmission activates an SPS configuration.

In a seventeenth aspect, alone or in combination with one or more of the fifteenth through sixteenth aspects, the DCI transmission schedules a plurality of repetitions of a PUSCH.

In an eighteenth aspect, alone or in combination with one or more of the fifteenth through seventeenth aspects, the DCI transmission indicates one or more repetitions of a PUCCH.

In a nineteenth aspect, alone or in combination with one or more of the first through eighteenth aspects, process 500 includes receiving an indication of a UE capability of the UE, wherein transmitting the activity state indication comprises transmitting the activity state indication based at least in part on the UE capability.

In a twentieth aspect, alone or in combination with the nineteenth aspect, the UE capability comprises a capability of maintaining a phase continuity for a pair of uplink communications having an intervening event that occurs between a transmission of a first uplink communication of the pair of uplink communications and a transmission of a second uplink communication of the pair of uplink communications.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
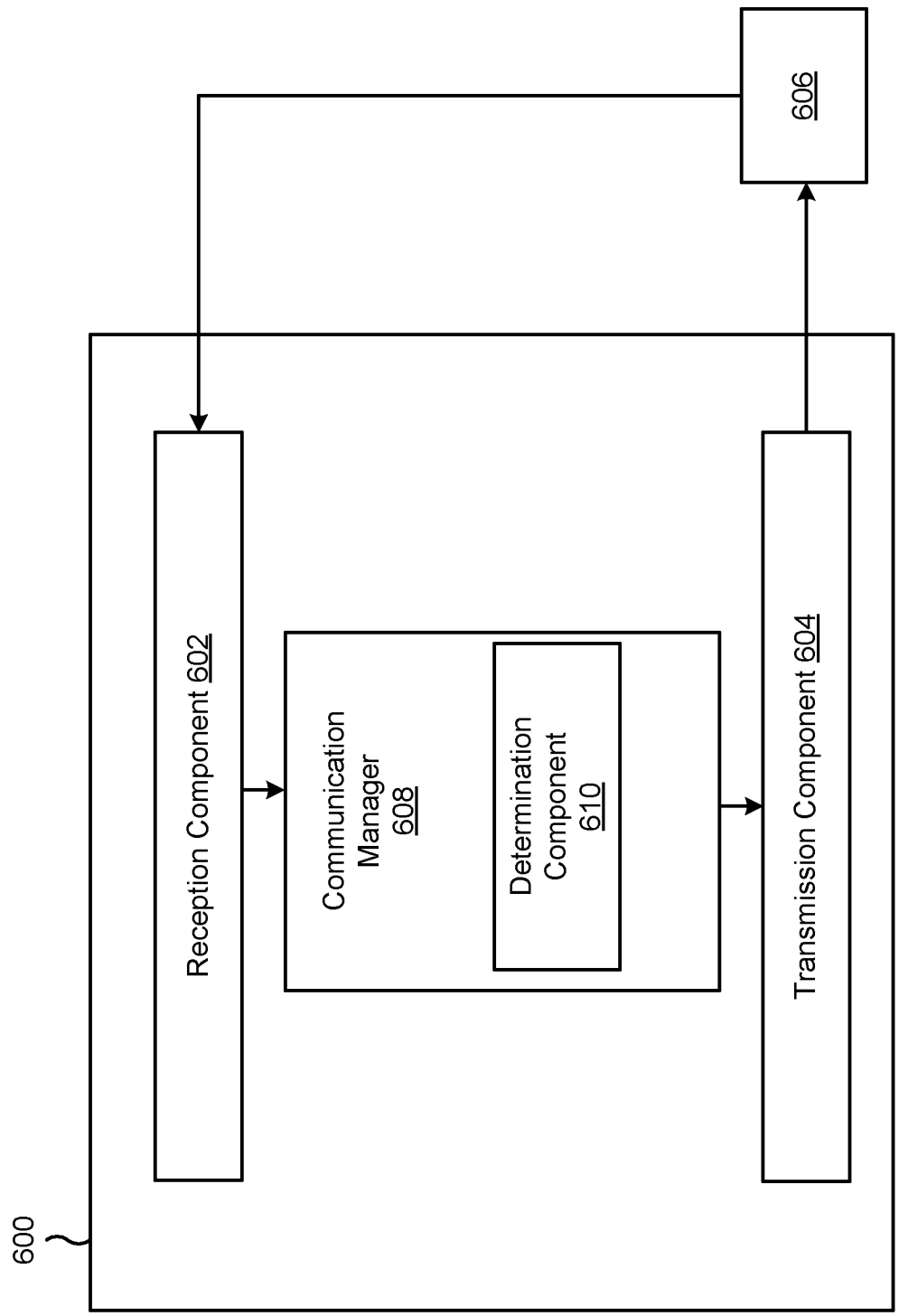
FIGS. 6 and 7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a network node, or another wireless communication device) using the reception component 602 and the transmission component 604. As further shown, the apparatus 600 may include a communication manager 608. The communication manager 608 may include a determination component 610.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The determination component 610 may determine that an uplink DMRS bundling operation associated with a physical channel has started. In some aspects, the determination component 610 may include one or more antennas, a modulator, a transmit MIMO processor, a transmit processor, a controller/processor, a memory, or a combination thereof, of the UE described above in connection with FIG. 2. In some aspects, the determination component 610 may include the reception component 602 and/or the transmission component 604.

The communication manager 608 may change an activity state of a reception operation associated with periodic downlink communications based at least in part on determining that the uplink DMRS bundling operation has started. In some aspects, the communication manager 608 may include one or more antennas, a modulator, a transmit MIMO processor, a transmit processor, a controller/processor, a memory, or a combination thereof, of the UE described above in connection with FIG. 2. In some aspects, the communication manager 608 may include the determination component 610, the reception component 602, and/or the transmission component 604.

The reception component 602 may receive, from a network node, an activity state configuration comprising an activity state indication, wherein changing the activity state of the reception operation comprises changing the activity state of the reception operation based at least in part on the activity state indication.

The reception component 602 may receive, from a network node, a DCI transmission comprising an activity state indication, wherein changing the activity state of the reception operation comprises changing the activity state of the reception operation based at least in part on the activity state indication.

The determination component 610 may determine a UE capability of the UE, wherein changing the activity state of the reception operation comprises changing the activity state of the reception operation based at least in part on the UE capability.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
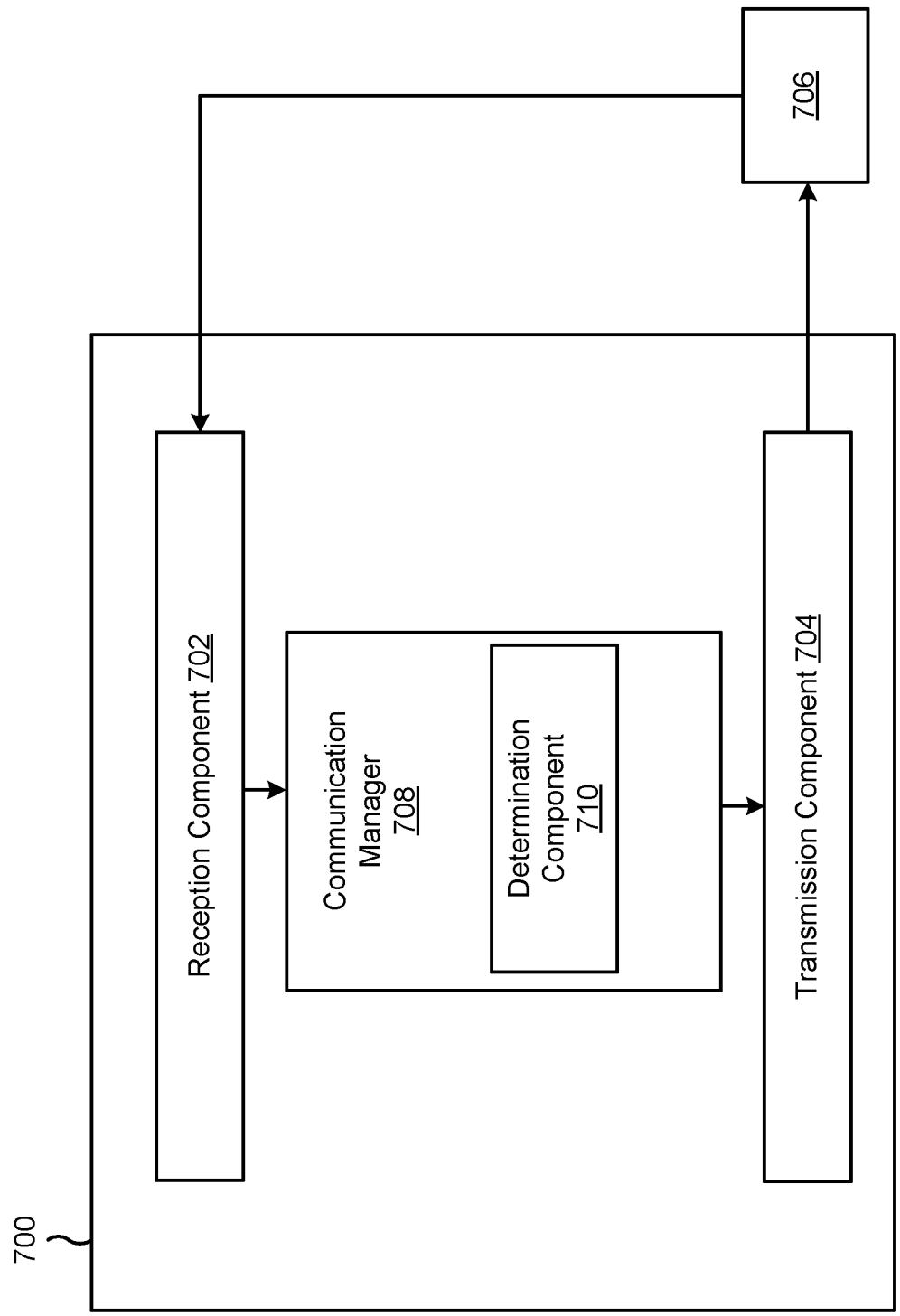

FIG. 7 is a block diagram of an example apparatus 700 for wireless communication. The apparatus 700 may be a network node, or a network node may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a network node, or another wireless communication device) using the reception component 702 and the transmission component 704. As further shown, the apparatus 700 may include a communication manager 708. The communication manager 708 may include a determination component 710.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The reception component 702 may receive, from a UE, an indication that a plurality of time-domain resources are associated with an uplink DMRS bundling operation associated with a physical channel. The transmission component 704 may transmit an activity state indication comprising an indication to change an activity state of a reception operation associated with periodic downlink communications based at least in part on a determination that the uplink DMRS bundling operation has started.

The reception component 702 may receive an indication of a UE capability of the UE, wherein transmitting the activity state indication comprises transmitting the activity state indication based at least in part on the UE capability.

The determination component 710 may determine that a UE supports uplink DMRS bundling based at least in part on the UE capability. In some aspects, the determination component 710 may include one or more antennas, a modulator, a transmit MIMO processor, a transmit processor, a controller/processor, a memory, or a combination thereof, of the base station described above in connection with FIG. 2. In some aspects, the determination component 710 may include the reception component 702 and/or the transmission component 704.

The communication manager 708 may generate an activity state indication. In some aspects, the communication manager 708 may include one or more antennas, a modulator, a transmit MIMO processor, a transmit processor, a controller/processor, a memory, or a combination thereof, of the base station described above in connection with FIG. 2. In some aspects, the communication manager 708 may include the determination component 710, the reception component 702, and/or the transmission component 704.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: determining that an uplink demodulation reference signal (DMRS) bundling operation associated with a physical channel has started; and changing an activity state of a reception operation associated with periodic downlink communications based at least in part on determining that the uplink DMRS bundling operation has started.

Aspect 2: The method of Aspect 1, wherein changing the activity state of the reception operation comprises dropping the reception operation during a time period corresponding to the uplink DMRS bundling operation.

Aspect 3: The method of Aspect 2, wherein dropping the reception operation comprises dropping blind detection of physical downlink control channel communications associated with one or more monitoring occasions that occur during the time period corresponding to the uplink DMRS bundling operation.

Aspect 4: The method of any of Aspects 1-3, wherein changing the activity state of the reception operation comprises deprioritizing the reception operation during a time period corresponding to the uplink DMRS bundling operation.

Aspect 5: The method of any of Aspects 1-4, wherein the reception operation comprises at least one of a monitoring action or a receiving action.

Aspect 6: The method of any of Aspects 1-5, wherein the periodic downlink communications comprise at least one semi-persistent scheduling instance that occurs during a time period corresponding to the uplink DMRS bundling operation.

Aspect 7: The method of any of Aspects 1-6, wherein the uplink DMRS bundling operation comprises a joint channel estimation process for a plurality of repetitions of at least one of a physical uplink shared channel or a physical uplink control channel.

Aspect 8: The method of any of Aspects 1-7, wherein the uplink DMRS bundling operation comprises a joint channel estimation process for at least one of a physical uplink shared channel transmission or a physical uplink control channel transmission.

Aspect 9: The method of any of Aspects 1-8, further comprising receiving, from a network node, an activity state configuration comprising an activity state indication, wherein changing the activity state of the reception operation comprises changing the activity state of the reception operation based at least in part on the activity state indication.

Aspect 10: The method of Aspect 9, wherein receiving the activity state configuration comprises receiving a radio resource control message that indicates the activity state configuration.

Aspect 11: The method of either of Aspects 9 or 10, wherein changing the activity state of the reception operation comprises dropping or deprioritizing blind detection of physical downlink control channel communications associated with one or more monitoring occasions that occur during a time period corresponding to the uplink DMRS bundling operation, and wherein the activity state configuration comprises a portion of a search space configuration for a search space associated with the one or more monitoring occasions.

Aspect 12: The method of any of Aspects 9-11, wherein changing the activity state of the reception operation comprises dropping or deprioritizing blind detection of physical downlink control channel communications associated with one or more monitoring occasions that occur during a time period corresponding to the uplink DMRS bundling operation, and wherein the activity state configuration comprises a portion of a control resource set (CORESET) configuration for a CORESET associated with the one or more monitoring occasions.

Aspect 13: The method of any of Aspects 9-12, wherein the activity state configuration comprises a portion of a semi-persistent scheduling configuration.

Aspect 14: The method of any of Aspects 9-13, wherein the activity state configuration comprises a portion of a configuration of a configured grant that indicates a physical uplink shared channel repetition.

Aspect 15: The method of any of Aspects 9-14, wherein the activity state configuration comprises a portion of a physical uplink control channel (PUCCH) resource set configuration that indicates a bundled PUCCH repetition.

Aspect 16: The method of any of Aspects 1-15, further comprising receiving, from a network node, a downlink control information (DCI) transmission comprising an activity state indication, wherein changing the activity state of the reception operation comprises changing the activity state of the reception operation based at least in part on the activity state indication.

Aspect 17: The method of Aspect 16, wherein the DCI transmission activates a semi-persistent scheduling configuration.

Aspect 18: The method of either of Aspects 16 or 17, wherein the DCI transmission schedules a plurality of repetitions of a physical uplink shared channel.

Aspect 19: The method of any of Aspects 16-18, wherein the DCI transmission indicates one or more repetitions of a physical uplink control channel.

Aspect 20: The method of any of Aspects 1-19, further comprising determining a UE capability of the UE, wherein changing the activity state of the reception operation comprises changing the activity state of the reception operation based at least in part on the UE capability.

Aspect 21: The method of Aspect 20, wherein the UE capability comprises a capability of maintaining a phase continuity for a pair of uplink communications having an intervening event that occurs between a transmission of a first uplink communication of the pair of uplink communications and a transmission of a second uplink communication of the pair of uplink communications.

Aspect 22: A method of wireless communication performed by a network node, comprising: receiving, from a user equipment (UE), an indication that a plurality of time-domain resources are associated with an uplink demodulation reference signal (DMRS) bundling operation associated with a physical channel; and transmitting an activity state indication comprising an indication to change an activity state of a reception operation associated with periodic downlink communications based at least in part on a determination that the uplink DMRS bundling operation has started.

Aspect 23: The method of Aspect 22, wherein the indication to change the activity state of the reception operation comprises an indication to drop the reception operation during a time period corresponding to the uplink DMRS bundling operation.

Aspect 24: The method of Aspect 23, wherein the indication to drop the reception operation comprises an indication to drop blind detection of physical downlink control channel communications associated with one or more monitoring occasions that occur during the time period corresponding to the uplink DMRS bundling operation.

Aspect 25: The method of any of Aspects 22-24, wherein the indication to change the activity state of the reception operation comprises an indication to deprioritize the reception operation during a time period corresponding to the uplink DMRS bundling operation.

Aspect 26: The method of any of Aspects 22-25, wherein the reception operation comprises at least one of a monitoring action or a receiving action.

Aspect 27: The method of any of Aspects 22-26, wherein the periodic downlink communications comprise at least one semi-persistent scheduling instance that occurs during a time period corresponding to the uplink DMRS bundling operation.

Aspect 28: The method of any of Aspects 22-27, wherein the uplink DMRS bundling operation comprises a joint channel estimation process for a plurality of repetitions of at least one of a physical uplink shared channel or a physical uplink control channel.

Aspect 29: The method of any of Aspects 22-28, wherein the uplink DMRS bundling operation comprises a joint channel estimation process for at least one of a physical uplink shared channel transmission or a physical uplink control channel transmission.

Aspect 30: The method of any of Aspects 22-29, wherein transmitting the activity state indication comprising transmitting an activity state configuration that includes the activity state indication.

Aspect 31: The method of Aspect 30, wherein transmitting the activity state configuration comprises transmitting a radio resource control message that indicates the activity state configuration.

Aspect 32: The method of either of Aspects 30 or 31, wherein the indication to change the activity state of the reception operation comprises an indication to drop or deprioritize blind detection of physical downlink control channel communications associated with one or more monitoring occasions that occur during a time period corresponding to the uplink DMRS bundling operation, and wherein the activity state configuration comprises a portion of a search space configuration for a search space associated with the one or more monitoring occasions.

Aspect 33: The method of any of Aspects 30-32, wherein the indication to change the activity state of the reception operation comprises an indication to drop or deprioritize blind detection of physical downlink control channel communications associated with one or more monitoring occasions that occur during a time period corresponding to the uplink DMRS bundling operation, and wherein the activity state configuration comprises a portion of a control resource set (CORESET) configuration for a CORESET associated with the one or more monitoring occasions.

Aspect 34: The method of any of Aspects 30-33, wherein the activity state configuration comprises a portion of a semi-persistent scheduling configuration.

Aspect 35: The method of any of Aspects 30-34, wherein the activity state configuration comprises a portion of a configuration of a configured grant that indicates a physical uplink shared channel repetition.

Aspect 36: The method of any of Aspects 30-35, wherein the activity state configuration comprises a portion of a physical uplink control channel (PUCCH) resource set configuration that indicates a bundled PUCCH repetition.

Aspect 37: The method of any of Aspects 22-36, wherein transmitting the activity state indication comprises transmitting a downlink control information (DCI) transmission comprising the activity state indication.

Aspect 38: The method of Aspect 37, wherein the DCI transmission activates a semi-persistent scheduling configuration.

Aspect 39: The method of either of Aspects 37 or 38, wherein the DCI transmission schedules a plurality of repetitions of a physical uplink shared channel.

Aspect 40: The method of any of Aspects 37-39, wherein the DCI transmission indicates one or more repetitions of a physical uplink control channel.

Aspect 41: The method of any of Aspects 22-40, further comprising receiving an indication of a UE capability of the UE, wherein transmitting the activity state indication comprises transmitting the activity state indication based at least in part on the UE capability.

Aspect 42: The method of Aspect 41, wherein the UE capability comprises a capability of maintaining a phase continuity for a pair of uplink communications having an intervening event that occurs between a transmission of a first uplink communication of the pair of uplink communications and a transmission of a second uplink communication of the pair of uplink communications.

Aspect 43: An apparatus for wireless communication at a device, comprising a processor; memory coupled with the processor; and instructions stored in the memory and executable by the processor to cause the apparatus to perform the method of one or more Aspects of Aspects 1-21.

Aspect 44: A device for wireless communication, comprising a memory and one or more processors coupled to the memory, the one or more processors configured to perform the method of one or more Aspects of Aspects 1-21.

Aspect 45: An apparatus for wireless communication, comprising at least one means for performing the method of one or more Aspects of Aspects 1-21.

Aspect 46: A non-transitory computer-readable medium storing code for wireless communication, the code comprising instructions executable by a processor to perform the method of one or more Aspects of Aspects 1-21.

Aspect 47: A non-transitory computer-readable medium storing a set of instructions for wireless communication, the set of instructions comprising one or more instructions that, when executed by one or more processors of a device, cause the device to perform the method of one or more Aspects of Aspects 1-21.

Aspect 48: An apparatus for wireless communication at a device, comprising a processor; memory coupled with the processor; and instructions stored in the memory and executable by the processor to cause the apparatus to perform the method of one or more Aspects of Aspects 22-42.

Aspect 49: A device for wireless communication, comprising a memory and one or more processors coupled to the memory, one or more processors configured to perform the method of one or more Aspects of Aspects 22-42.

Aspect 50: An apparatus for wireless communication, comprising at least one means for performing the method of one or more Aspects of Aspects 22-42.

Aspect 51: A non-transitory computer-readable medium storing code for wireless communication, the code comprising instructions executable by a processor to perform the method of one or more Aspects of Aspects 22-42.

Aspect 52: A non-transitory computer-readable medium storing a set of instructions for wireless communication, the set of instructions comprising one or more instructions that, when executed by one or more processors of a device, cause the device to perform the method of one or more Aspects of Aspects 22-42.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication comprising one or more processors coupled to memory and configured to:
   determine that an uplink demodulation reference signal (DMRS) bundling operation associated with a physical channel has started; and
   change an activity state of a reception operation associated with periodic downlink communications based at least in part on determining that the uplink DMRS bundling operation has started,
   wherein the one or more processors, to change the activity state of the reception operation, are configured to drop or deprioritize the reception operation during a time period corresponding to the uplink DMRS bundling operation.

2. The UE of claim 1, wherein the one or more processors, to change the activity state of the reception operation, are configured to drop the reception operation during the time period corresponding to the uplink DMRS bundling operation.

3. The UE of claim 2, wherein the one or more processors, to drop the reception operation, are configured to drop blind detection of physical downlink control channel communications associated with one or more monitoring occasions that occur during the time period corresponding to the uplink DMRS bundling operation.

4. The UE of claim 1, wherein the one or more processors, to change the activity state of the reception operation, are configured to deprioritize the reception operation during the time period corresponding to the uplink DMRS bundling operation.

5. The UE of claim 1, wherein the reception operation comprises at least one of a monitoring action or a receiving action.

6. A user equipment (UE) for wireless communication comprising one or more processors coupled to memory and configured to:
   determine that an uplink demodulation reference signal (DMRS) bundling operation associated with a physical channel has started; and
   change an activity state of a reception operation associated with periodic downlink communications based at least in part on determining that the uplink DMRS bundling operation has started, wherein:
   the uplink DMRS bundling operation comprises a joint channel estimation process for (i) a plurality of repetitions of at least one of a physical uplink shared channel or a physical uplink control channel, or (ii) at least one of a physical uplink shared channel transmission or a physical uplink control channel transmission; or
   the periodic downlink communications comprise at least one semi-persistent scheduling instance that occurs during a time period corresponding to the uplink DMRS bundling operation; or
   the one or more processors are configured to determine a UE capability of the UE and to change the activity state of the reception operation based at least in part on the UE capability, wherein the UE capability comprises a capability of maintaining a phase continuity for a pair of uplink communications having an intervening event that occurs between a transmission of a first uplink communication of the pair of uplink communications and a transmission of a second uplink communication of the pair of uplink communications.

7. The UE of claim 6, wherein the one or more processors are configured to:
   determine the UE capability of the UE; and
   change the activity state of the reception operation based at least in part on the UE capability,
   wherein the UE capability comprises the capability of maintaining the phase continuity for the pair of uplink communications having the intervening event that occurs between the transmission of the first uplink communication of the pair of uplink communications and the transmission of the second uplink communication of the pair of uplink communications.

8. The UE of claim 6, wherein the periodic downlink communications comprise the at least one semi-persistent scheduling instance that occurs during the time period corresponding to the uplink DMRS bundling operation.

9. The UE of claim 6, wherein the uplink DMRS bundling operation comprises the joint channel estimation process for the plurality of repetitions of the at least one of the physical uplink shared channel or the physical uplink control channel.

10. The UE of claim 6, wherein the uplink DMRS bundling operation comprises the joint channel estimation process for the at least one of the physical uplink shared channel transmission or the physical uplink control channel transmission.

11. A user equipment (UE) for wireless communication comprising one or more processors coupled to memory and configured to:
   determine that an uplink demodulation reference signal (DMRS) bundling operation associated with a physical channel has started;
   change an activity state of a reception operation associated with periodic downlink communications based at least in part on determining that the uplink DMRS bundling operation has started,
   wherein the one or more processors, to change the activity state of the reception operation, are configured to change the activity state of the reception operation based at least in part on an activity state indication received from a network node, and
   wherein:
      the one or more processors are configured to receive a downlink control information (DCI) transmission comprising the activity state indication; or
      the one or more processors are configured to receive an activity state configuration comprising the activity state indication, and
         wherein the one or more processors, to change the activity state of the reception operation, are configured to drop or deprioritize blind detection of physical downlink control channel communications associated with one or more monitoring occasions that occur during a time period corresponding to the uplink DMRS bundling operation, and the activity state configuration comprises either a portion of a search space configuration for a search space associated with the one or more monitoring occasions or a portion of a control resource set (CORESET) configuration for a CORESET associated with the one or more monitoring occasions, or
         wherein the activity state configuration comprises a portion of a semi-persistent scheduling configuration, or a portion of a configuration of a configured grant that indicates a physical uplink shared channel repetition, or a portion of a physical uplink control channel (PUCCH) resource set configuration that indicates a bundled PUCCH repetition.

12. The UE of claim 11, wherein the one or more processors are configured to receive the activity state configuration comprising the activity state indication and wherein the one or more processors, to change the activity state of the reception operation, are configured to drop or deprioritize blind detection of the physical downlink control channel communications associated with the one or more monitoring occasions that occur during the time period corresponding to the uplink DMRS bundling operation, and wherein the activity state configuration comprises the portion of the search space configuration for the search space associated with the one or more monitoring occasions.

13. The UE of claim 11, wherein the one or more processors are configured to receive the activity state configuration comprising the activity state indication and wherein the one or more processors, to change the activity state of the reception operation, are configured to drop or deprioritize blind detection of the physical downlink control channel communications associated with the one or more monitoring occasions that occur during the time period corresponding to the uplink DMRS bundling operation, and wherein the activity state configuration comprises the portion of the control resource set (CORESET) configuration for the CORESET associated with the one or more monitoring occasions.

14. The UE of claim 11, wherein the one or more processors are configured to receive the activity state configuration comprising the activity state indication and wherein the activity state configuration comprises the portion of the semi-persistent scheduling configuration.

15. The UE of claim 11, wherein the one or more processors are configured to receive the activity state configuration comprising the activity state indication and wherein the activity state configuration comprises the portion of a configuration of the configured grant that indicates the physical uplink shared channel repetition.

16. The UE of claim 11, wherein the one or more processors are configured to receive the activity state configuration comprising the activity state indication and wherein the activity state configuration comprises the portion of the physical uplink control channel (PUCCH) resource set configuration that indicates the bundled PUCCH repetition.

17. The UE of claim 11, wherein the one or more processors are configured to receive, from the network node, the downlink control information (DCI) transmission comprising the activity state indication.

18. The UE of claim 17, wherein the DCI transmission activates a semi-persistent scheduling configuration.

19. The UE of claim 17, wherein the DCI transmission schedules a plurality of repetitions of a physical uplink shared channel.

20. The UE of claim 17, wherein the DCI transmission indicates one or more repetitions of a physical uplink control channel.

21. A network node for wireless communication comprising one or more processors coupled to memory and configured to:

receive, from a user equipment (UE), an indication that a plurality of time-domain resources are associated with an uplink demodulation reference signal (DMRS) bundling operation associated with a physical channel; and transmit an activity state indication comprising an indication to change an activity state of a reception operation associated with periodic downlink communications based at least in part on a determination that the uplink DMRS bundling operation has started.

22. The network node of claim 21, wherein the indication to change the activity state of the reception operation comprises an indication to drop the reception operation during a time period corresponding to the uplink DMRS bundling operation.

23. The network node of claim 22, wherein the indication to drop the reception operation comprises an indication to drop blind detection of physical downlink control channel communications associated with one or more monitoring occasions that occur during the time period corresponding to the uplink DMRS bundling operation.

24. The network node of claim 21, wherein the indication to change the activity state of the reception operation comprises an indication to deprioritize the reception operation during a time period corresponding to the uplink DMRS bundling operation.

25. The network node of claim 21, wherein the periodic downlink communications comprise at least one semi-persistent scheduling instance that occurs during a time period corresponding to the uplink DMRS bundling operation.

26. The network node of claim 21, wherein the uplink DMRS bundling operation comprises a joint channel estimation process for a plurality of repetitions of at least one of a physical uplink shared channel or a physical uplink control channel.

27. The network node of claim 21, wherein the uplink DMRS bundling operation comprises a joint channel estimation process for at least one of a physical uplink shared channel transmission or a physical uplink control channel transmission.

* * * * *